United States Patent [19]

Deszynski et al.

[11] Patent Number: 4,597,609
[45] Date of Patent: Jul. 1, 1986

[54] METHOD OF MELTING SULPHUR

[75] Inventors: Andrew W. Deszynski, Calgary; Andre Tucque, Drayton Valley, both of Canada

[73] Assignee: Burza Resources Ltd., Calgary, Canada

[21] Appl. No.: 680,622

[22] Filed: Dec. 11, 1984

[30] Foreign Application Priority Data

Jul. 31, 1984 [CA] Canada ................................. 460054

[51] Int. Cl.$^4$ ............................................. E21C 41/14
[52] U.S. Cl. ......................................... 299/6; 299/14; 23/293 S; 126/271.1; 126/343.5 A; 219/296; 219/421; 219/523; 222/146.2
[58] Field of Search ................ 299/6, 14, 3; 23/293 S; 126/343.5 A, 271.1, 271.2 R, 271.2 A, 271.2 B, 271.2 C; 165/86; 219/421, 523, 296, 277, 278; 222/146.2, 256

[56] References Cited

U.S. PATENT DOCUMENTS 4,050,740 9/1977 Ellithorpe et al. ..................... 299/6
4,203,625 5/1980 Ellithorpe et al. ..................... 299/6

FOREIGN PATENT DOCUMENTS 1091430 12/1980 Canada .

Primary Examiner—Barry S. Richman
Assistant Examiner—Titus B. Ledbetter, Jr.
Attorney, Agent, or Firm—Rogers, Bereskin & Parr

[57] ABSTRACT

A method of melting sulphur, in block form, uses a heating device having lower heating surfaces and means for withdrawing sulphur. The device is positioned on a block of sulphur so that the heating surface(s) are inclined downardly to a collection location spaced inwardly from sides of the sulphur block. The heat is supplied to the heating surfaces to melt sulphur, and molten sulphur is withdrawn by the means for withdrawing it. As sulphur is melted, the heating device is progressively lowered through the block of sulphur. A corresponding apparatus having inclined heating surfaces is provided. As the sulphur is melted so that molten sulphur runs down towards the collection location, the device can be used right up against the edge of a block of sulphur.

9 Claims, 4 Drawing Figures

METHOD OF MELTING SULPHUR

This invention relates to a method and apparatus for melting solid sulphur in block form.

During the extraction from the ground of natural gas, it is common for the gas to contain large quantities of sulphur. This sulphur is extracted, and consequently is produced as a by-product. As demand for sulphur can vary, it is common to store the resultant sulphur in block form. This is particularly the case, where the sulphur is generated some distance away from a market for it.

As a result, large blocks of sulphur are produced, which may be, for example, of the order of 25' high and have horizontal dimensions of 1000' or more. The blocks are formed by allowing molten sulphur to cool. Creation of the blocks thus does not present any particular problem, although as discussed in greater detail below problems can arise with voids in the blocks.

However, when the demand for sulphur rises, it is required to transport the sulphur. One then has the problem of breaking up a large block of sulphur. Early techniques relied upon mechanical breaking up of the sulphur block or explosives. Neither technique is particularly satisfactory, as inevitably large quantities of sulphur dust are generated. This dust pollutes the surrounding environment and can be a health hazard.

More recent techniques that have been proposed rely upon melting the sulphur block. However, melting techniques applied to date have suffered from a variety of disadvantages.

An early technique was to place a heater on top of the block, spaced inwards from its sides. The sulphur was melted by the heater, and the heater was allowed to sink into the sulphur block, whilst the molten sulphur was steadily extracted. When the heater reached the bottom of the block, it was extracted, and then moved to a new site, to form a fresh hole in the block. This technique had the disadvantage that walls had to be left between adjacent holes in the block. Also, these walls had to be sufficient to support machinery on top of the block for manipulating the heater etc. Consideration had to be given to the fact that the heater or heating element might not drop perfectly vertically through the block, so that walls between adjacent holes might vary in thickness. One was still left with the problem of how to remove the sulphur walls.

U.S. Pat. No. 4,050,740 discloses a different technique. An inclined heating element is used. Along its lower edge it is provided with a trough for collecting molten sulphur. As a consequence, it can be placed adjacent the edge of the sulphur block, with the trough against the edge. It can then melt a section of the block including part of the side of the block. This does eliminate the formation of dividing walls between holes in the block. However, the heater has to be inclined at a substantial angle, to ensure that the molten sulphur flows down to the trough, and does not flow in some other direction. When the heating element reaches the ground, the trough is at ground level with the heating element extending at an angle upwards from it. As a consequence, a significant triangular section block piece of the sulphur block can be left on the ground, which still presents removal problems.

Canadian Pat. No. 1,064,224 discloses a method of sulphur melting by lateral displacement of a heating element. The apparatus employed is large, complex and costly. It is has a trailer and heating element which can be brought from a horizontal to a vertical position by means of hydraulic multi-section rams. With the heating element in the vertical position, it is brought up against the face of a sulphur block, and then moved through it horizontally. Whilst this does indeed melt the sulphur, again it cannot reach right down to the ground. Experience shows that one is always left with a layer of sulphur on the ground of 1-2' depth. Further, compared to other apparatus, the trailer has to be specially made for the sole purpose of this operation and consequently requires a large capital investment.

A later proposal is found in Canadian Pat. No. 1,091,430. It again uses flat heating elements that are dropped vertically down through a block of sulphur. It tackles some of the problems of previous arrangements, in which heating elements were dropped vertically down through the sulphur block. In particular, it is intended to accurately control the geometry and spatial position of the holes, and to prevent leakage of liquid sulphur from the bottom of the heating element. To this end, it provides a heating element with a downwardly depending skirt including a heating bar. The skirt is provided with means for sealing it to a portion of the block extending upwards inside the skirt. Whilst such an arrangment may well overcome some of the disadvantages of previous heating elements, it still cannot be used up against an edge of the block, so that walls are still left between the holes formed in the sulphur block.

What is required is a sulphur melting apparatus that is relatively simple and compact. It should enable the sulphur to be melted in a controlled manner. Further, it should be capable of melting the sulphur without the necessity of leaving dividing walls, and should be capable of melting the sulphur up to the edge of the block. Also, it is desirable that the apparatus and method should melt the sulphur right down to the ground, so that there is no residual ground layer of sulphur that has still to be removed by mechanical or other means.

According to the present invention, there is provided a method of melting block sulphur, the method comprising the steps of:

positioning a heating device, having lower heating surfaces, and means for withdrawing molten sulphur, at a predetermined location on a block of sulphur, so that the surfaces of the heating device are inclined downwardly to a collection location spaced inwardly from sides of the sulphur block, the collection location being adjacent the means for withdrawing sulphur;

supplying heat to the heating device, to melt sulphur adjacent the surfaces thereof, whereby the molten sulphur flows downwardly to the collection location;

withdrawing molten sulphur by said means for withdrawing molten sulphur from the collection location; and progressively lowering the heating device down through the block of sulphur, as molten sulphur is withdrawn.

The method could use a heating device having a single flat surface inclined to a corner remote from edges of the sulphur block.

The present invention also provides an apparatus for carrying out the method as just defined. The apparatus includes a heating device having one or more heating surfaces, which are inclined downwardly towards a collection location. The collection location, in use, is arranged inwardly from sides of the block, to ensure that molten sulphur flowing to the collection location will not spill over the edge of the block. The apparatus can be integral with a vehicle adapted to carry and manoeuvre the apparatus. To this end, the vehicle can include a forward, wheeled carrying frame, adapted to carry and support a rear edge of the heating device. In use, this frame also ensures that the heating device is guided vertically downwards. A front of the heating device is then carried by means of a boom extending forwardly from the vehicle. This arrangement should provide a carefully controlled lowering of the heating device. This is to be contrasted with many known techniques, where the heating apparatus used can, effectively, wander sideways as it is dropped down into the sulphur block. This makes efficient melting of the sulphur block difficult, and withdrawal of the heating device from a hole that is not truly vertical can also be difficult.

For a better understanding of the present invention, and to show more clearly how it may be carried into effect, reference will now be made, by way of example, to the accompanying drawings in which.

Figure 1:
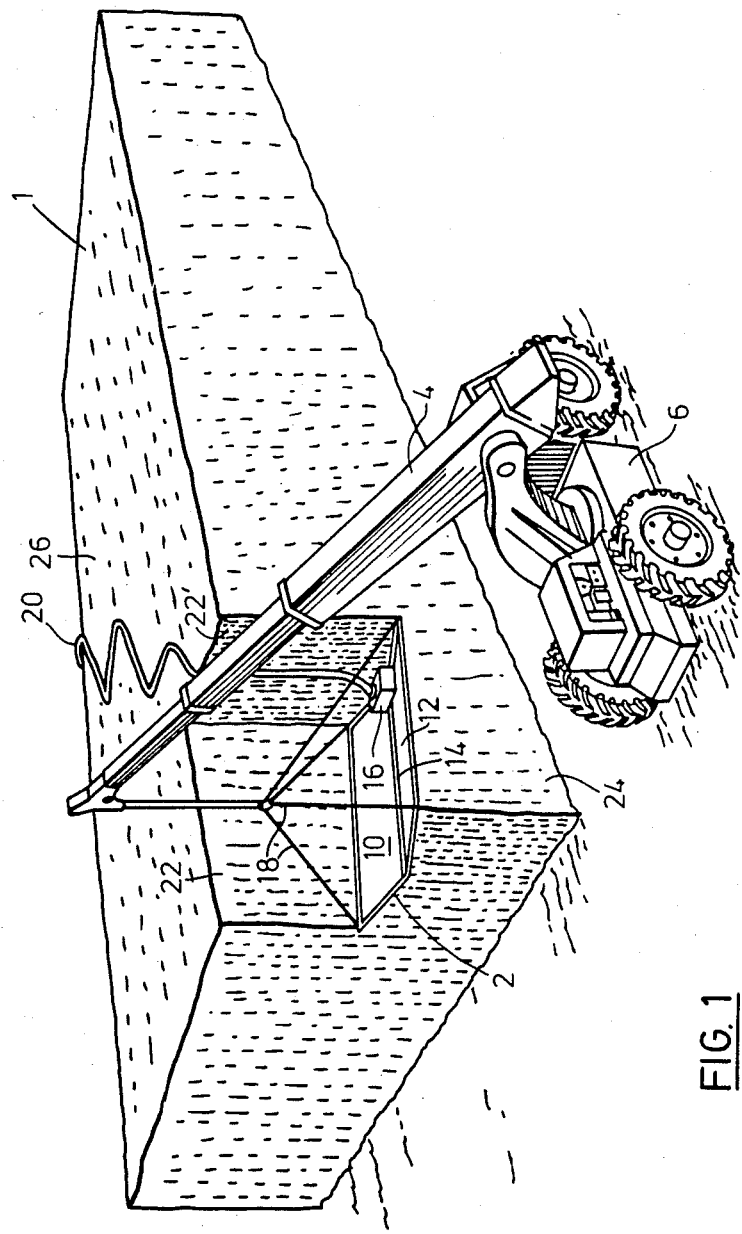
FIG. 1 shows a perspective view of a sulphur block, a heating device according to a first embodiment of the present invention, and a vehicle carrying the heating device.

With reference first of all to FIG. 1, there is shown a sulphur block designated by the reference 1, which represents sulphur accumulated over a period of time at, for example, a sour gas well. The sulphur block 1 can be several hundred feet long and can have comparable width and height, as indicated.

To melt the sulphur block 1, a heating device 2 is provided. As shown, for the purposes of illustration, the heating device 2 is suspended, in known manner, from a boom 4 of a vehicle 6. The boom 4 is telescopic, and the vehicle 6 can position the heating device 2 as required on the sulphur block 1.

The heating device 2 comprises a first heating element 10 and a second heating element 12, which are symmetrical about an axis of the device 2. The heating elements 10, 12 are inclined at a slight angle to one another, so that, as orientated, both heating elements 10, 12 are inclined downwards towards a central ridge 14 extending along an axis of the device 2.

At one end of the ridge 14, there is located a collection means 16, for collecting molten sulphur. To ensure that sulphur flows towards the collection means 16, the heating elements 12, 10 and the ridge 14 are additionally inclined downwards the collection means 16. This is achieved by appropriate arrangement of suspension cables 18 for the heating device 2.

As described in detail below, the heating device 2 heats sulphur beneath it, and this sulphur, because of the orientation described, will flow down the spaces below the heating elements 10, 12 towards the collection means 16. The collection means 16 is connected to a hose or tube 20, through which the molten sulphur is drawn off. As sulphur has a low coefficient of thermal conductivity and is a good insulator, the molten sulphur can be readily drawn off through the hose 20.

The heating device 2 is heated by, for example, electricity, steam heating, oil or glycol. For electricity, an electrical supply cable would be connected, and each of the heating elements 10, 12 would have an appropriate array of electrical heating elements. A preferred alternative is to use steam heating, and in this case a steam supply pipe would be provided, and each of the heating elements 10, 12 would have an array of pipes for the steam, such as those described in detail for the FIG. 4 embodiment. With the heating device 2 so heated, it will melt sulphur below it, to enable the sulphur to be drawn off through the hose 20. As sulphur is drawn off, the heating device 2 will be progressively lowered down through the sulphur block 1. This can be done with the suspension cables 18 slack as, in contrast to known methods, the heating device 2 will guide itself vertically down. As the heating elements 10, 12 are inclined to guide molten sulphur to the collection means 16, the heating device 2 can be brought right up to the edges of the block 1, as shown in FIG. 1. Thus, a corner of the block 1 is melted away to leave walls 22 on two sides, the other two sides being open. As shown, there is a portion 24 of the block 1, awaiting melting by the heating device 2. Although not shown, the heating device 2 can be lowered through portions of the block enclosed on three, or all four, sides.

The heating device 2 will be progressively lowered down through this portion 24, until the collection means 16 reaches the ground. At this point, if the ground is level, the ridge 14 will be inclined slightly outwardly from the collector 16 and above the ground. Similarly, the individual heating elements 10, 12 will be inclined upwardly away from the ground. To ensure maximum removal of sulphur, the heating device 2 can then be further lowered, until the ridge 14 is fully in contact with the ground. This will melt further sulphur. It is to be appreciated that, as the ridge 14 will then be generally horizontal, all the sulphur melted might not flow to the collector 16, but the bulk of it should be collected. Then, the heating device 2 can be lifted up and placed on an adjacent portion of the sulphur block 1, such as the portion indicated at 26. The heating device 2 can then be lowered through the block 1 as described above, without leaving any sidewalls.

The technique just described should be contrasted with known techniques, where walls have to be left on all four sides of a hole in the sulphur block, or techniques where a collecting trough has to be provided at the edge of the sulphur block. This latter technique prevents sulphur being melted right down to the ground, and there is always the possibility of spillage of molten sulphur. The present technique forms a surface where sulphur is being melted, which naturally guides the molten sulphur away from the open sides of the block, thereby reducing the likelihood of spillage of molten sulphur. The collection means 16 can be quite simple, as the shape formed in the sulphur block 1 serves to guide the sulphur to the desired location. No special troughs channels or similar devices are required.

Figure 2:
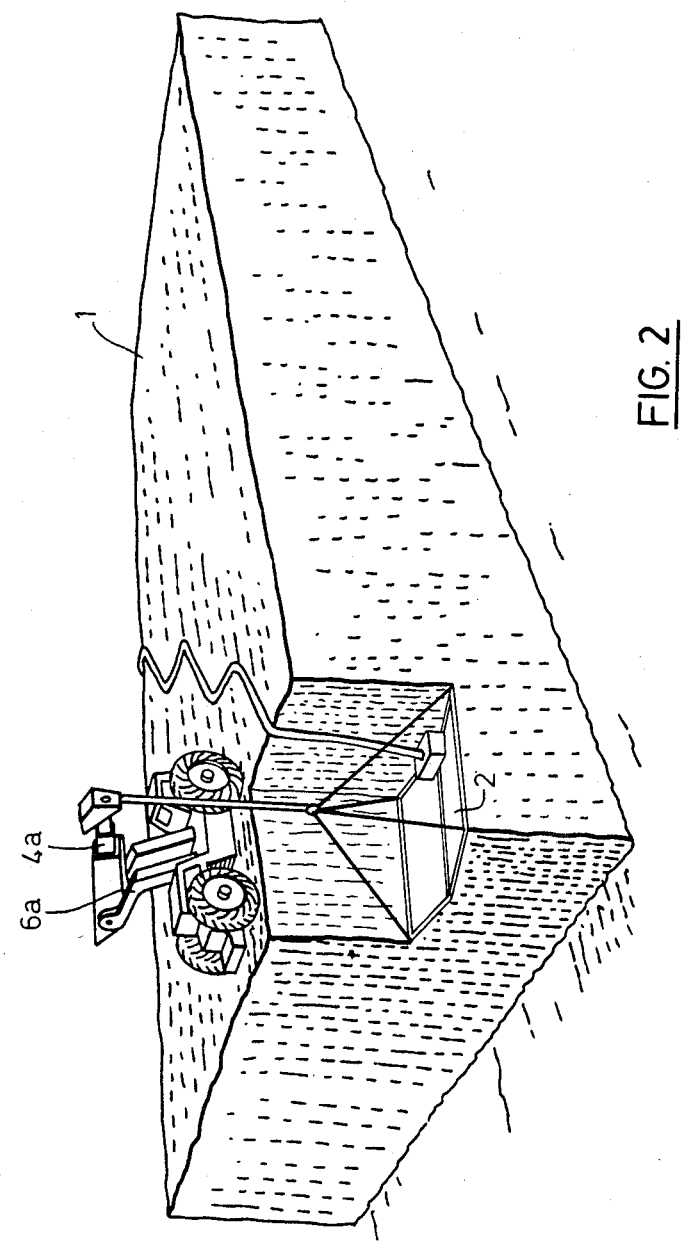
FIG. 2 shows a perspective view, similar to FIG. 1, with a vehicle supporting the heating device located on top of the sulphur block.

It is to be appreciated that the sulphur block 1 can be of substantial dimensions, and FIG. 2 shows, by way of illustration, an alternative method of handling the heating device 2. Here a vehicle 6a, with a boom 4a is placed on top of the sulphur block 1. The heating device 2 and other components are the same as those shown in FIG. 1. This arrangement is particularly suited to instances where the sulphur block 1 is higher than the reach permitted by the telescopic boom of a vehicle. The vehicle 6a can enable all of the sulphur block 1 to be melted, except for a portion of area sufficient to support the vehicle 6a. The heater 2 is operated in the same way as described above.

Figure 3:
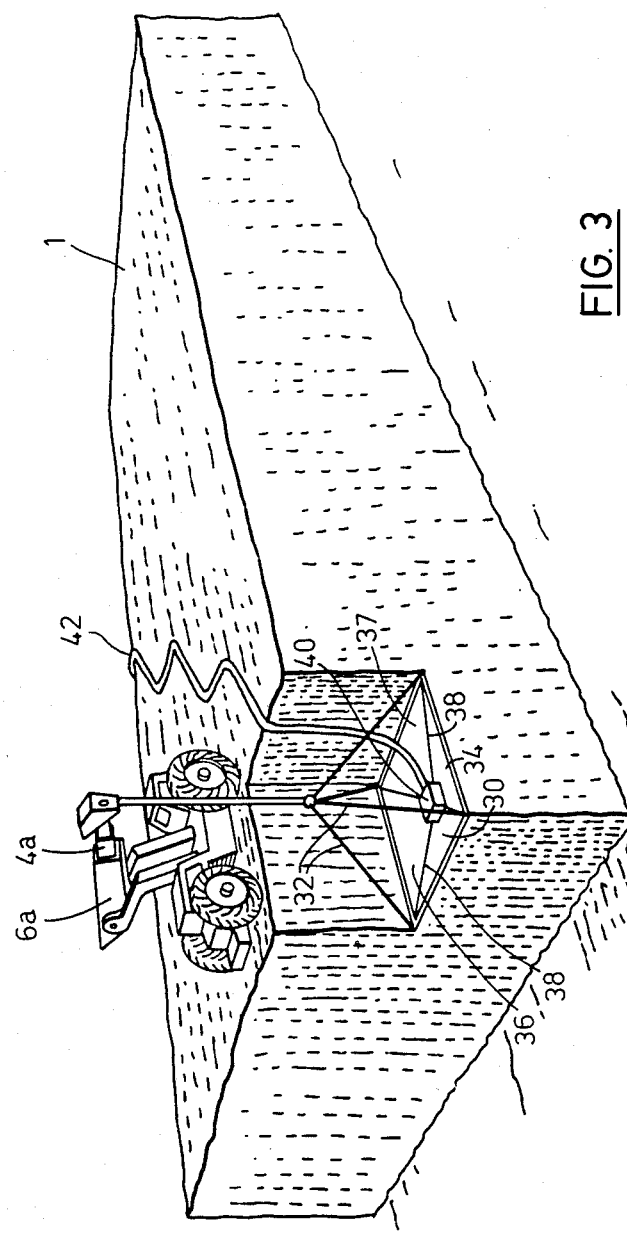
FIG. 3 shows a perspective view of an alternative embodiment of the heating device and a vehicle supporting the heating device on a sulphur block.

Turning now to FIG. 3, there is shown another embodiment of the present invention, which is slightly different from that of the previous embodiments. Again, by way of example a vehicle 6a is shown on top of the sulphur block 1, although it is to be appreciated that the vehicle 6a could be replaced by the vehicle 6 on the ground as shown in FIG. 1. Here, the heating device is designated by the reference 30. It is suspended by lines 32 of equal length from a main support line or cable extending from the telescopic boom 4a. The heating device 30 comprises four separate heating elements 34, 35, 36 and 37, which are of generally similar triangular profile. The heating elements are joined along ridges 38, and are inclined downwardly towards a central collection means 40, the ridges 38 being correspondingly inclined. The collection means 40 is similar to the collection means 16, but here as shown it is located centrally in the heating device 30. Thus, as sulphur is melted by the heating device 30, it will flow towards the center of the device 30 and be drawn off through the collecting means 40 and then through a hose 42.

Apart from the provision of a central, as opposed to edge, collection means 40, this embodiment of the heating means 30 is operated in the same way as that described for the embodiment of FIGS. 1 and 2. Again, as the two heating elements 34 and 35 at the edge of the block 1 are inclined inwardly, molten sulphur naturally flows towards the collection means 40 and away from the edges of the block 1, thereby eliminating, or at least minimizing, the likelihood of spillage of molten sulphur.

Figure 4:
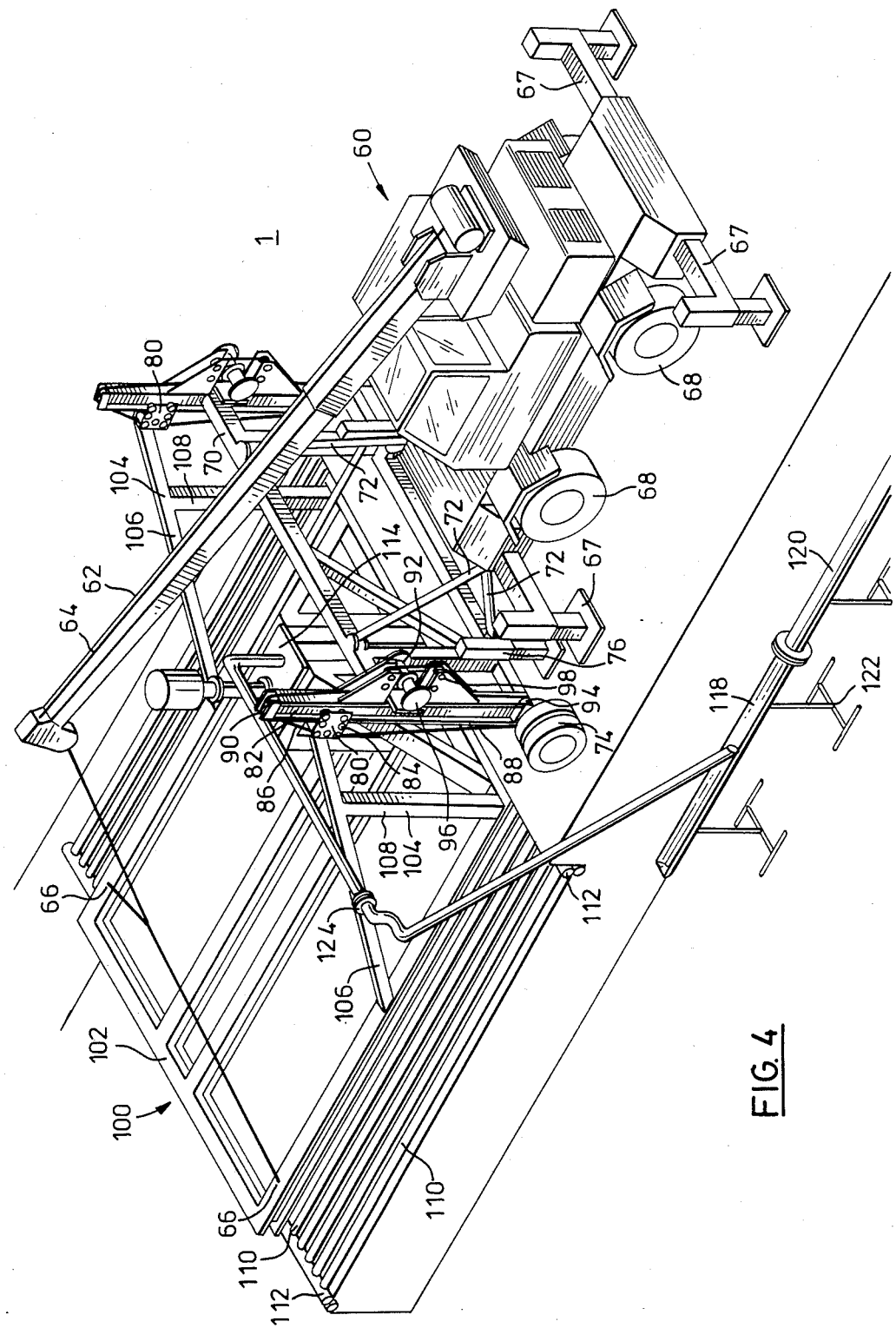
FIG. 4 shows a further embodiment of the heating device and a vehicle for carrying the heating device according to the present invention.

Reference will now be made to FIG. 4 which shows in greater detail a further embodiment of the present invention. This embodiment shows a top view of the sulphur block, again designated by the reference 1. On the sulphur block 1, there is located a vehicle 60, specially adapted for manipulating the heating device. The heating device itself is designated by the reference 100.

The vehicle 60 includes a boom 62, for supporting the heating device 100. A cable 64 extends along the boom 62, and is attached at two locations 66 to the heating device 100. The vehicle 60 additionally includes four adjustable and retractable supports 67 at each corner of the vehicle. As shown, these supports 67 enable the vehicle 60 to be positioned at a desired location on the sulphur block 1, with the vehicle 60 securely positioned and its wheels 68 clear of the sulpur block 1.

Attached to the vehicle 60, there is a support frame 70, for supporting one end of the heating device 100. The support frame 70 is connected to the main body of the vehicle 60 by members 72, pivotally attached to the frame 70. The frame 70 additionally includes its own wheels 74 and supports 76, similar to the supports 67. Thus, like the vehicle 60, the frame 70 can be securely positioned by the supports 76. The frame 70 takes loads imposed by the heating device 100, so as to prevent the vehicle 60 being overturned.

The heating device 100 has a main framework 102, formed from longitudinal and transverse I-beams. At the rear of the framework 102, there are two supports 104 on either side of the framework 102. Each support 104 comprises an inclined member 106 and a vertical bracing member 108.

To describe the method of attachment of the inclined members 106 to the support frame 70, reference will be made to the left-hand end of the support frame 70. The inclined member 106 is pivotally connected at its free end to a slide 80. This slide 80 is mounted for vertical sliding movement along an I-beam 82 of the support frame 70, by means of rollers 84. An upper cable 86 and a lower cable 88 are attached to the slide 80, to control its movement. The upper cable 86 passes over upper rollers 90 at the top of the I-beam 82, and then down to a respective reel 92. The lower cable 88 correspondingly passes under lower rollers at the bottom of the I-beam 82. The cable 88 then passes around further rollers 98, to a respective reel 96. The reels 92, 96 are either driven together, or individually. Where they are driven together, the reels 92, 96 are mounted on a common shaft, and the further rollers 98 are so arranged as to include a tensioning device, to maintain both cables 86, 88 in tension. It will thus be seen that the slide 80, and hence the rear end of the heating device 100 can be moved up and down, by control of the cables 86, 88. Tne limit of the vertical travel of the heating device 100 is thus limited by the vertical height of the I-beam 82, and accordingly this I-beam 82 should be sized to give the required vertical movement.

The heating device 100 in this embodiment is heated by steam. It includes a plurality of longitudinally extending pipes 100, which are connected to two pairs of transverse end pipes 112, which serve as headers to distribute the steam to the pipes 110. The pipes 110 are arranged in two, horizontal layers. In each layer, the pipes 110 are spaced apart by an amount slightly less than the diameter of each pipe, and the two layers of pipes 110 are so positioned relative to one another, that each layer of pipes 110 covers the spaces between the pipes of the adjacent layer. Thus, the pipes 110, together provide total coverage of the area of the heating device 100. For clarity, the pipes 110, which could be seen through the gaps in the framework 102, have been omitted; it is to be appreciated that the layers of pipes 110 extend the full width of the heating device 100.

To collect molten sulphur, a collecting means 114 is provided, mounted on the framework 102. It includes a pump (not shown), and a discharge pipe 116. Here, the discharge pipe 116 opens into a trough 118, which in turn is connected to a discharge pipe 120. The trough 118 and pipe 120 are supported on supports 122.

In use, the vehicle 60 is positioned at a desired location on the sulphur block 1. Its supports 67 are then lowered, to securely position it. The frame 70 is similarly securely positioned by its supports 76. At this stage, the heating device 100 is held at a high position in which the slides 80 are at the tops of the I-beams 82. In this position, the pipes 110 are above the level of the sulphur block 1. The heating device 100 is then lowered, until it contacts the surface of the sulphur block. The lowering of the heating device 100 is controlled, so that the rear end is lower than the forward end. Then with heat supplied to the pipes 110, sulphur is melted and drawn off through the collection means 114. As sulphur is melted, the cable 62 and reels 92, 96 are controlled to lower the heating device 100, whilst maintaining it titled with the forward end slightly higher than the rear end, to cause molten sulphur to flow back to the collection device 114. Also, the heating pipes 110 are inclined similarly to the embodiment shown in FIGS. 1 and 2, to cause molten sulphur to flow towards the collection device 114. The heating device 100 can be lowered, until the slides 80 reach the lower end of the I-beams 82. Then, the heating device 100 is moved to an adjacent area of the sulphur block 1, which is then melted down to the level of the first zone or area. This process is repeated, until the top of the sulphur block 1 is melted down to form a new top surface lower than the original top surface. Then, the process can be repeated on the new top surface, until eventually ground level is reached. Note that the pipe or duct 116 is connected by a rotatable joint 124. Thus, as the heating device 100 is lowered, the pipe 116 can rotate, and its end will travel along the trough 118, thereby accomodating movement of the heating device 100.

Alternatively, the heating device 100 can be so dimensioned as to permit it to travel through the full height of the sulphur block in one cut. Also, it can enable the heating device to be placed on the sulphur block, whilst the vehicle is on the ground.

It is to be appreciated that the apparatus of the present invention enables virtually all of a sulphur block to be recovered with only a minimal amount of sulphur being left on the ground. Present techniques usually leave a substantial layer, a so-called "base pad". This is either left, or has to be broken up mechanically with the associated problems of noise, pollution etc.

We claim:

1. A method for melting a block of sulphur, the method comprising the steps of:
    (a) positioning a heating device having a plurality of top edges and a plurality of lower heating surfaces at a predetermined location on a block of sulphur, so that siad heating surfaces of the heating device are inclined downwardly from said top edges of the heating device and form a collection location in the block of sulphur beneath said heating surfaces when heat is supplied to the heating device, the heating device further having a means for withdrawing molten sulphur from the collection location, the collection location being adjacent to the means for withdrawing molten sulphur from the collection location;
    (b) supplying heat to the heating device adjacent to said heating surfaces thereof to melt sulphur, so that the molten sulphur flows downwardly through spaces formed beneath said surfaces to the collection location;
    (c) withdrawing molten sulphur by said means for withdrawing molten sulphur from the collection location; and
    (d) progressively lowering th heating device downwardly through the block of sulphur as molten sulphur is withdrawn,
    whereby the block of sulphur is melted without the necessity of leaving walls of unmelted sulphur and the heater is carefully lowered progressivley vertically downwardly.

2. A method as claimed in claim 1, wherein the step of positioning a heating device on a block of sulphur includes suspending the heating device from a mobile vehicle.

3. A method as claimed in claim 2, wherein the vehicle has a boom attached thereto, and the heating device is suspended from said boom.

4. A method as claimed in claim 3, wherein the vehicle is positioned on the ground adjacent to the sulphur block.

5. A method as claimed in claim 3, wherein the vehicle is positioned on top of the sulphur block.

6. A method as claimed in claim 5 wherein downward movement of the heating device is controlled by guide means of the vehicle.

7. A method as claimed in claim 6 wherein the downward movement of the heating device is controlled by said guide means comprising a plurality of slides mounted for sliding movement on vertical members mounted on means attached to the vehicle, with the slides additionally being attached to the heating device.

8. a method as claimed in any one of claims 4, 5 and 7, wherein the heating device comprises two of said heating surfaces which have elongated shapes with horizontally spaced distal ends and are connected to each other along a ridge and wherein said means for withdrawing molten sulphur from the collection location is located at one of said surfaces.

9. A method as claimed in any one of claims 4, 5, and 7, wherein the collectin location is positioned centrally of the heating device, and wherein said surfaces comprise four triangular heating surfaces which have apexes located at the collection location.

* * * * *